(12) United States Patent
Shadrin et al.

(10) Patent No.: US 11,347,892 B2
(45) Date of Patent: May 31, 2022

(54) SYSTEM AND METHOD FOR ACCESS CONTROL IN ELECTRONIC CONTROL UNITS OF VEHICLES

(71) Applicant: AO Kaspersky Lab, Moscow (RU)

(72) Inventors: Alexander S. Shadrin, Moscow (RU); Pavel V. Dyakin, Moscow (RU); Dmitry A. Kulagin, Moscow (RU)

(73) Assignee: AO Kaspersky Lab, Moscow (RU)

(*) Notice: Subject to any disclaimer, the term of this patent is extended or adjusted under 35 U.S.C. 154(b) by 206 days.

(21) Appl. No.: 16/874,948

(22) Filed: May 15, 2020

(65) Prior Publication Data

US 2021/0157941 A1 May 27, 2021

(30) Foreign Application Priority Data

Nov. 27, 2019 (RU) .......................... RU2019138370

(51) Int. Cl.
*G06F 21/62* (2013.01)
*B60R 16/023* (2006.01)

(52) U.S. Cl.
CPC ........ *G06F 21/629* (2013.01); *B60R 16/0231* (2013.01); *G06F 2221/2149* (2013.01)

(58) Field of Classification Search
CPC ........... G06F 21/629; G06F 2221/2149; B60R 16/0231

(Continued)

(56) References Cited

U.S. PATENT DOCUMENTS

2010/0292867 A1* 11/2010 Bohm .................. B60W 50/14
                                                                718/1
2012/0255010 A1   10/2012 Sallam
(Continued)

FOREIGN PATENT DOCUMENTS

CA        2399175 A1 *  8/2001
CN     103631695 A   *  3/2014  ............. H04L 12/66
(Continued)

OTHER PUBLICATIONS

Ruikun et al., "An Efficient Access Control Framework For Service-Oriented Architecture of Vehicle", IEEE, doi: 10.1109/ICCWAMTIP53232.2021.9674146, 2021, pp. 404-412. (Year: 2021).*

(Continued)

*Primary Examiner* — Peter G Shaw
(74) *Attorney, Agent, or Firm* — ArentFox Schiff LLP; Michael Fainberg

(57) ABSTRACT

Disclosed herein are systems and methods for access control in an electronic control unit (ECU). In one aspect, an exemplary method comprises, by an operating system (OS) kernel of the ECU of a vehicle, intercepting at least one request for an interaction of a control application with a basic component through an interaction interface provided by the basic component for interactions with applications, requesting from a security subsystem of the operating system, a verdict as to whether or not access for the interaction of the control application with the basic component through the interaction interface can be provided, and when the verdict is received from the security subsystem granting the access, providing the interaction between the basic component and the control application through the interaction interface in accordance with the received verdict.

16 Claims, 6 Drawing Sheets

(58) Field of Classification Search
USPC .......................................................... 726/17
See application file for complete search history.

(56) References Cited

U.S. PATENT DOCUMENTS

| | | | |
|---|---|---|---|
| 2016/0328173 A1* | 11/2016 | Miloser | G06F 9/45545 |
| 2018/0006999 A1 | 4/2018 | Doukhvalov et al. | |
| 2018/0189103 A1 | 7/2018 | Teschler et al. | |
| 2019/0025829 A1* | 1/2019 | Fujiwara | G06F 3/167 |
| 2019/0050577 A1 | 2/2019 | Kulagin et al. | |

FOREIGN PATENT DOCUMENTS

| | | | | | |
|---|---|---|---|---|---|
| CN | 104272316 | A | * | 1/2015 | G06F 21/44 |
| CN | 109035117 | A | * | 12/2018 | |
| CN | 109246137 | A | | 1/2019 | |
| CN | 109479020 | A | * | 3/2019 | H04L 12/40097 |
| DE | 102017200286 | A1 | | 7/2017 | |
| DE | 102018202446 | A1 | | 8/2019 | |
| EP | 3099019 | A1 | | 11/2016 | |
| EP | 3828748 | A1 | * | 6/2021 | B60R 16/0231 |
| FR | 2908909 | A1 | * | 5/2008 | G06F 21/629 |
| JP | 2017128308 | A | * | 7/2017 | G06F 9/455 |
| JP | 2022502790 | A | * | 10/2019 | G06F 21/56 |
| WO | WO-2009080015 | A2 | * | 7/2009 | B60W 50/06 |
| WO | WO-2019123447 | A1 | * | 6/2019 | H04L 12/18 |

OTHER PUBLICATIONS

Rumez et al., "Integration of Attribute-based Access Control into Automotive Architectures", IEEE, doi: 10.1109/IVS.2019.8814265, 2019, pp. 1916-1922. (Year: 2019).*

Alam et al., "Securing Vehicle ECU Communications and Stored Data", IEEE, doi: 10.1109/ICC.2019.8762043, 2019, pp. 1-6. (Year : 2019).*

Han et al., "An Attribute-Isolated Secure Communication Architecture for Intelligent Connected Vehicles", IEEE, doi: 10.1109/TIV. 2020.3027717, pp. 545-555, Dec. 2020. (Year: 2020).*

Aust, "Paving the Way for Connected Cars with Adaptive AUTOSAR and AGL", IEEE, doi: 10.1109/LCNW.2018.8628558, 2018, pp. 53-58. (Year: 2018).*

Md Swawibe et al: "Securing Vehicle Electronic Control Unit (ECU) Communications and Stored Data", Aispace.library.queensu. ca, Sep. 30, 2018 (Sep. 30, 2018), pp. 1-95.

* cited by examiner

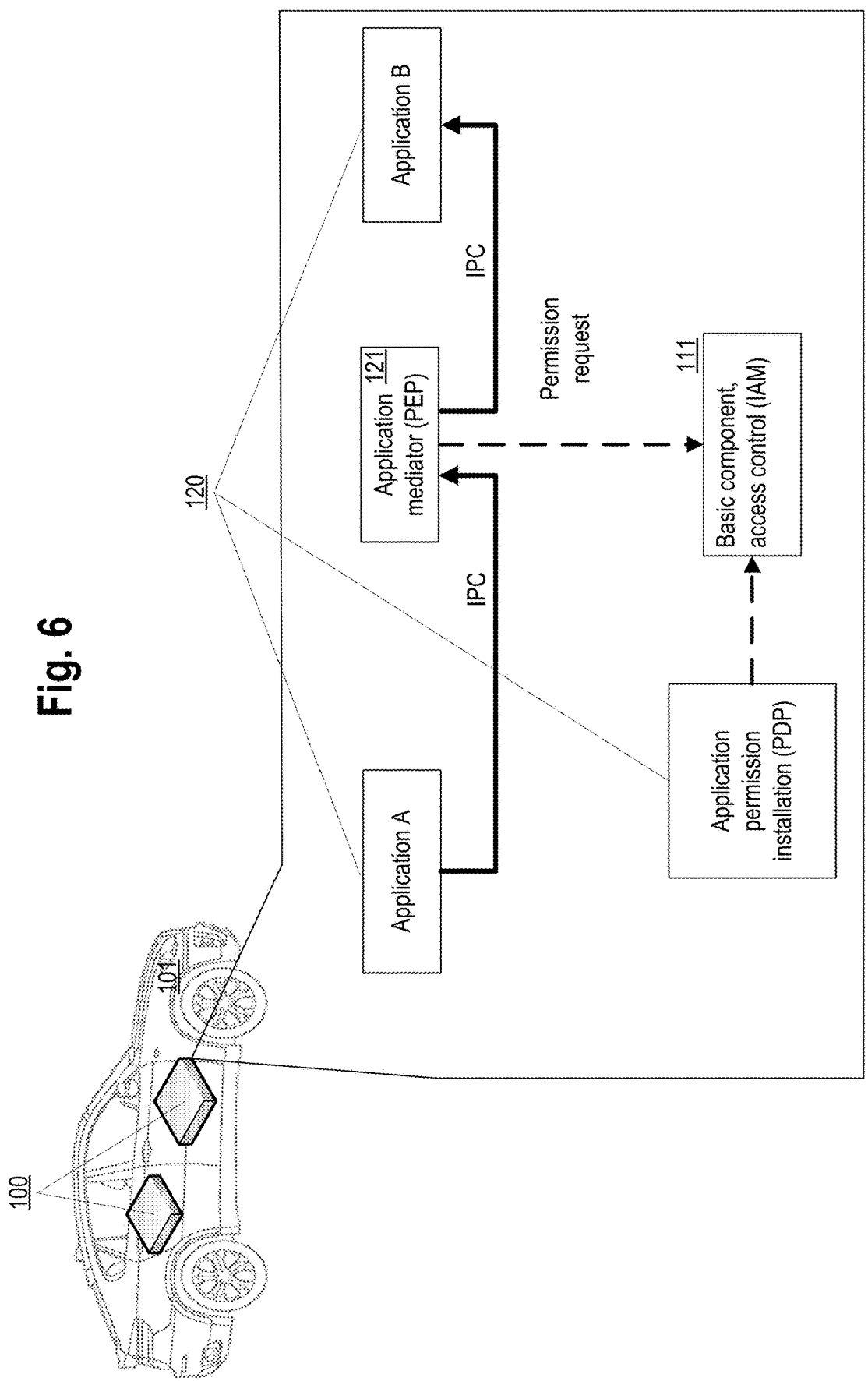

SYSTEM AND METHOD FOR ACCESS CONTROL IN ELECTRONIC CONTROL UNITS OF VEHICLES

CROSS REFERENCE TO RELATED APPLICATIONS

The present application claims priority to Russian Patent Application No. 2019138370, filed on Nov. 27, 2019, the entire content of which is incorporated herein by reference.

FIELD OF TECHNOLOGY

The present disclosure relates to the field of computer security, and, more specifically, to system and method for access control in electronic control units of vehicles.

BACKGROUND

At present, the automotive industry is developing rapidly along with the development of new technologies. New systems for controlling vehicles more comfortably are being introduced rapidly. Usually these systems are based on computer technologies.

The various systems of a vehicle are controlled by electronic control units, which in turn perform various algorithms. Thus, for example, in order to comply with the EURO ecology standards (EURO-4, EURO-5), car manufacturers need to optimize not only engines, but also the control systems of these engines to assure a more ecological exhaust without worsening the power characteristics. For a more adaptive ride, the control systems of the transmissions are optimized. The adaptations are for any number of conditions. For instance, the transmission may be adaptable to the driving style, the road conditions, and the weather conditions, shifting of the transmission more smoothly or sharply, engaging the rear or the front wheels and changing the torque transmitting force between the wheel axles. More complex systems, so-called advanced driver-assistance systems (ADAS), are being introduced everywhere, such as an automated parking system (using sensors registering the distance from the vehicle to an obstacle), a driving assist system (for example, recognizing by camera the position of the automobile in its lane and on the road overall), and an automated emergency braking system (for example, upon detecting an obstacle with the aid of infrared sensors). Moreover, electric cars, whose driving is controlled by computer systems located on board the vehicle, are gaining in popularity (e.g., as described in the publication "https://www.google.com/selfdrivingcar/"). The question of unmanned vehicle (both light and heavy) is also becoming more acute with the development of information technologies.

Classical standards exist for platforms on which control units operate. Control units for critical elements of a vehicle (such as the steering or braking system) are realized according to standards subject to heightened safety requirements. Moreover, such control units for critical elements of a vehicle usually run on a single-core processor with limited resources (for example, are often realized using specialized microcontrollers with low performance of the central processor and a small memory size). On the other hand, multimedia systems do not have heightened safety requirements, since their function (e.g., the reproduction of media files or the displaying of the geolocation on a map) does not directly affect the safety of the persons in the vehicle. The driver assistance systems that are being developed at present constitute an "interlayer" between multimedia and safety units. Therefore, heightened safety requirements are placed on driver assistance systems. In certain control units, real time systems are used, which in turn also limits the algorithms which can be implemented by the units.

At present, the Autosar consortium is developing a new standard which describes a software platform for contemporary high-performance electronic control units (ECU) used in vehicles—the Autosar Adaptive Platform (AAP). Among the key features of this standard are requirements on the assurance of the IT security of the systems built on this basis.

However, the AAP standard only places high-level requirements on the security subsystem and does not address issues regarding the realization of this subsystem. The standard considers various approaches to the realization of the subsystem. For example, in one exemplary approach, it is possible to use several policy decision points (PDP), while these decision-making points themselves can be realized in the form of additional applications running under the control of the AAP platform. The use of this approach does not allow (or significantly complicate) the creation of a security subsystem with specified attributes such as, completeness of the specification of the security policies, their mutual consistency, the specification of complex security policies. Furthermore, the use of this approach does not allow a statement of security attributes already specified in the standard for its basic components and services.

Thus, there is a need for a more optimal way of controlling access to electronic control units via a secure operating system.

SUMMARY

Aspects of the disclosure relate to access control in electronic control units, e.g., control units of vehicles. Disclosed methods and systems enable interaction between the processes in an electronic control unit of the vehicles (e.g., in cars, trucks, etc.) while providing security to the electronic control unit.

In one exemplary aspect, a method is provided for access control in an electronic control unit (ECU), the method comprising: by an operating system (OS) kernel of the ECU, intercepting at least one request for an interaction of a control application with a basic component through an interaction interface provided by the basic component for interactions with applications, requesting from a security subsystem of the operating system, a verdict as to whether or not access for the interaction of the control application with the basic component through the interaction interface can be provided, and when the verdict is received from the security subsystem granting the access, providing the interaction between the basic component and the control application through the interaction interface in accordance with the received verdict.

In one aspect, by the security subsystem of the operating system, the method determines the verdict as to whether the requested access can be granted for the interaction of the application with the basic component through the interaction interface.

In one aspect, the operating system comprises a secure OS.

In one aspect, the ECU comprises a control unit of a vehicle.

In one aspect, the basic component comprises at least a program element of an Autosar Adaptive Platform (AAP).

In one aspect, the basic component provides at least one interface for interactions with other basic components.

In one aspect, the security subsystem of the operating system is a single point for the determination of verdicts as to whether or not the access for the interaction is to be provided.

In one aspect, the security subsystem of the operating system determines the verdict using a formalized security model.

In one aspect, the verdict allows the interaction between the basic component and the control application when the interaction between the basic component and the control application conforms to the formalized security model.

In one aspect, the method further comprises: determining the verdict by the security subsystem of the operating system.

In one aspect, the interaction comprises an interaction between a process of an application for control of the ECU and the basic component.

According to one aspect of the disclosure, a system is provided for access control in an electronic control unit (ECU), the system comprising a hardware processor configured to: by an operating system (OS) kernel of the ECU, intercept at least one request for an interaction of a control application with a basic component through an interaction interface provided by the basic component for interactions with applications, request from a security subsystem of the operating system, a verdict as to whether or not access for the interaction of the control application with the basic component through the interaction interface can be provided, and when the verdict is received from the security subsystem granting the access, provide the interaction between the basic component and the control application through the interaction interface in accordance with the received verdict.

In one exemplary aspect, a non-transitory computer-readable medium is provided storing a set of instructions thereon for access control in an electronic control unit (ECU), wherein the set of instructions comprises instructions for: by an operating system (OS) kernel of the ECU, intercepting at least one request for an interaction of a control application with a basic component through an interaction interface provided by the basic component for interactions with applications, requesting from a security subsystem of the operating system, a verdict as to whether or not access for the interaction of the control application with the basic component through the interaction interface can be provided, and when the verdict is received from the security subsystem granting the access, providing the interaction between the basic component and the control application through the interaction interface in accordance with the received verdict.

The method and system of the present disclosure are designed to provide an interaction between the processes in an electronic control unit for a vehicle, e.g., a car, truck, etc.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 6 illustrates a variant of a scheme for providing access according to the specification of the AAP standard using a mediator.

DETAILED DESCRIPTION

Exemplary aspects are described herein in the context of a system, method, and a computer program for access control in an electronic control unit, e.g., an electronic control unit of a vehicle. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

In one aspect, the present disclosure describes a system for access control in an electronic control unit that is implemented on a computing system (e.g., a computer of the vehicle, etc.), that includes real-world devices, systems, components, and groups of components realized with the use of hardware such as integrated microcircuits (application-specific integrated circuits, ASICs) or field-programmable gate arrays (FPGAs) or, for example, in the form of a combination of software and hardware such as a microprocessor system and set of program instructions, and also on neurosynaptic chips. The functionality of such means of the system may be realized solely by hardware, and also in the form of a combination, where some of the functionality of the system means is realized by software, and some by hardware. In certain aspects, some or all of the components, systems, etc., may be executed on the processor of a general-purpose computer (such as the one shown in FIG. 4). Furthermore, the system components may be realized either within a single computing device or spread out among several interconnected computing devices.

Figure 1:
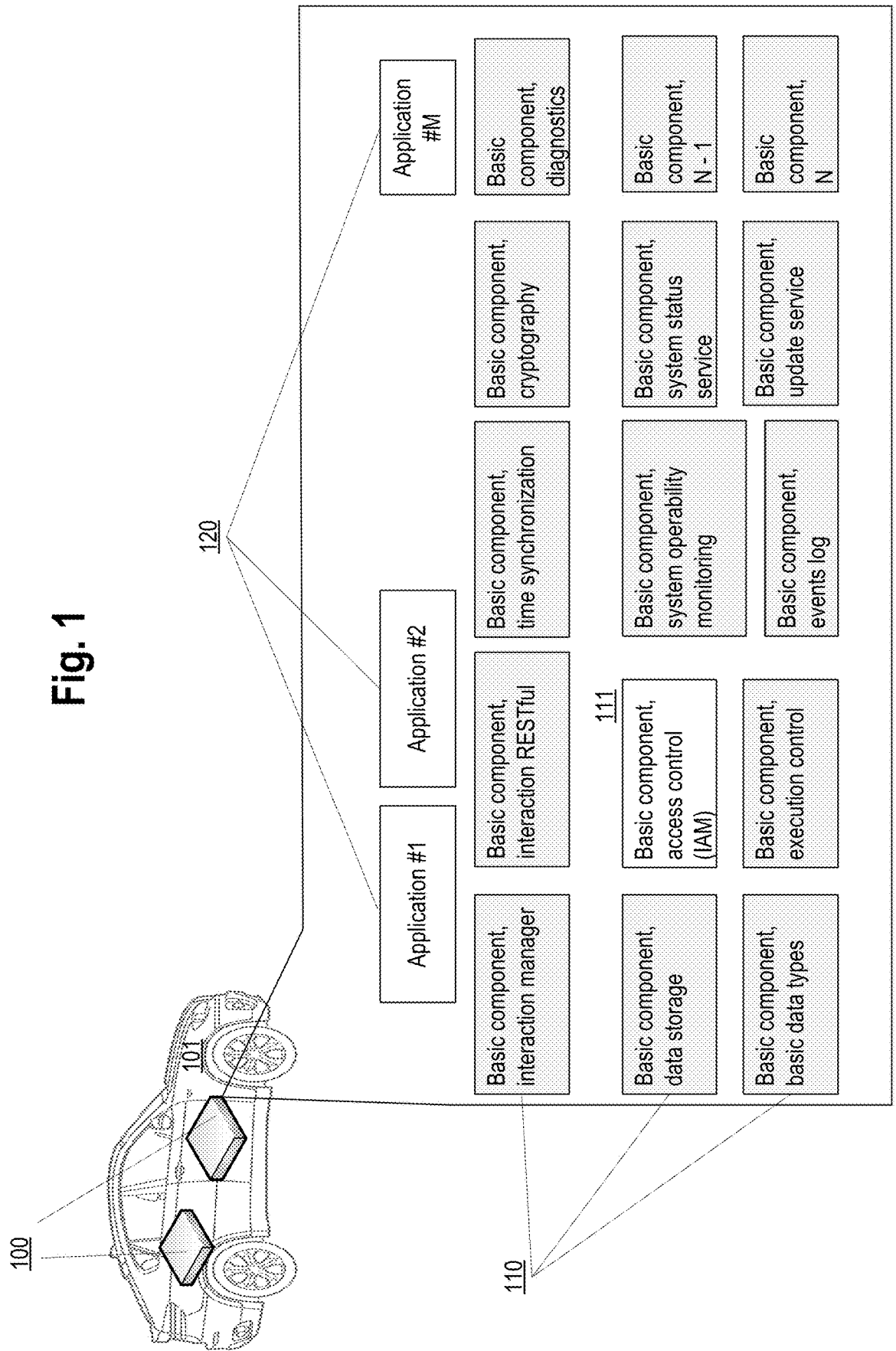
FIG. 1 illustrates a computer system for controlling a vehicle.

FIG. 1 illustrates a computer system for controlling vehicle 101, such as a car, truck and the like. The computer system includes one or more electronic control units (ECUs) 100 installed onboard of vehicle 101. In one aspect, ECU 100 implements the Autosar Adaptive Platform (AAP) standard.

The functionality of the ECU 100, in accordance with the AAP standard, is defined by a set of basic components 110. In addition, applications 120 are provided for realization of certain functionalities necessary for control of the vehicle 101.

In one example aspect, a basic component is a program element of the AAP platform (realized, for example, in the form of an application, a system application or a service) as defined in the AAP specification and is necessary for complete operations of the platform, including for proper functioning of the applications running under the control of the platform.

As described above, an application 120 realizes a certain functionality necessary for control of the vehicle 101. The application 120 includes the executable code of the application in binary form and a specification (manifest) describing the basic attributes of the application, stated in Autosar Extensible Markup Language (ARXML). ARXML is based on XML language. The specification includes at least:

the resources required for the application 120 (such as the memory volume, the linkage to certain cores of the ECU processor);

the states of the system in which a given application 120 needs to work (for example, when the engine is switched off the applications 120 of the driver assist systems are not working); and the interfaces provided by the application 120 to other applications 120.

The specification (manifest) of the application 120 is used for gaining access to the services of other applications 120, by abstracting from the specific realization of the Inter-Process Communication (IPC) between applications 120.

An application 120 can access (interact with) any given basic component 110 of the AAP standard and, by utilizing the services provided by the interfaces of the basic components 110, realize its functionality. Moreover, an application 120 may access other applications 120 via the interfaces provided by the respective applications.

In general, it does not matter in which ECU 100 the application 120 is installed. The AAP standard provides mechanisms for enabling a connection to other applications 120 installed and running in other ECUs 100 in a manner which is transparent to the applications 120.

Examples of the basic components 110 of the present disclosure are given below. For example, the basic components 110 may comprise at least one of: an execution manager, a communication manager, a platform health manager, a time synchronization manager, an identity and access control manager, and the like.

The execution manager is the component used for execution of applications. Depending on the state of the system, this basic component 110 launches or halts certain applications 120, based on the current state of the system. For example, if the automobile is parked with the engine switched off, this is one state and the system provides access to a group of applications; if the automobile is moving, this is another state, and the system provides access to another group of applications (possibly also including applications from the first group).

The communication manager is the component used for interaction monitoring. With the aid of the interaction manager, a registration is performed for services provided by the applications 120. The services provided by the applications 120 are detected and an information interaction with these services is enabled.

The platform health manager is used for operability monitoring. This component enables a determination of check points in the system and a monitoring of the proper working of the components 110 and the applications 120.

The time synchronization manager is the component that provides a unified time in all the systems of the vehicle 101. Since applications 120 may be executed in different ECUs 100 within the vehicle 101, time synchronization is provided via the time synchronization manager.

The identity and access manager (IAM) is used as the access control component and is responsible for identifying and saving all allowable interactions of the applications 120. In FIG. 1, the IAM 111 identifies and saves all allowable interactions of the applications 120 (which include applications #1, #2, . . . , #M). For example, suppose there are two applications A and B. Suppose also application B provides a certain service to application A, while the interface of the service of application B contains a set of methods described in the manifest of application B. The IAM 111 has the capability of specifying which methods of the service of application B can be accessed by application A. The same scheme is utilized to determine which applications 120 can gain access to the basic components of the platform. The IAM 111 analyzes the manifest of the applications 120 and grants permission to perform one interaction or another.

For platforms working in accordance with the AAP standard, the assemblage of these basic components 110 may be used to create applications.

The AAP specification includes proposals for components that addresses security. In systems designed based on the AAP specification, any number of components can be specified which are responsible for making security decisions (policy decision points, PDP). In addition, components can be specified for implementing these decisions (policy enforcement points, PEP). At the same time, no details are given as to the functionality of these components. Furthermore, the specification states that these details may be defined individually in each implementation of the AAP, including for example the possibility of implementing the PDP and the PEP as additional applications 120, or mediators.

Figure 5:
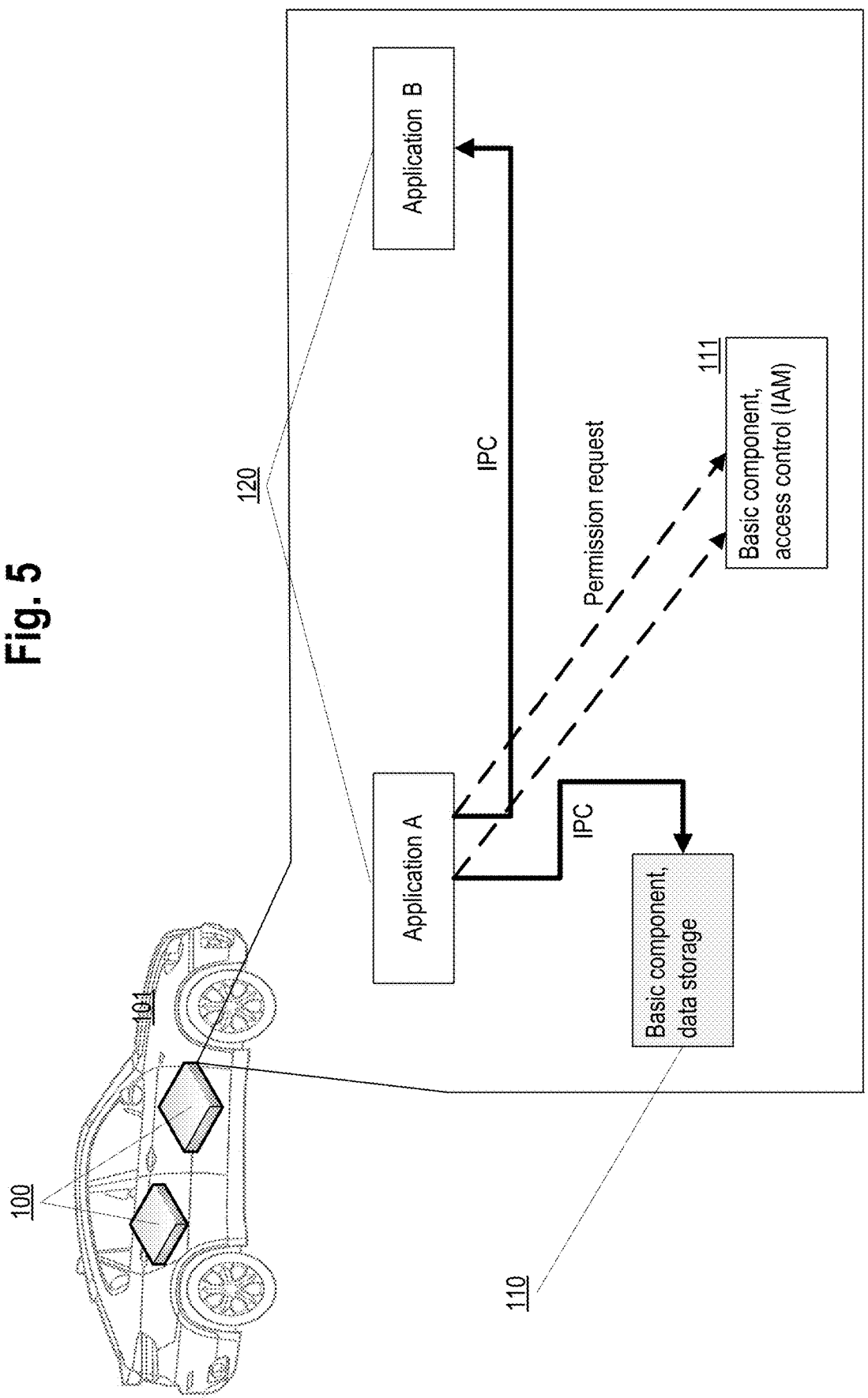
FIG. 5 illustrates a variant of a scheme for providing access according to the specification of the AAP standard (without a mediator).

For ease of understanding, variant schemes for the providing of access according to the specification of the AAP standard are shown in FIG. 5 and FIG. 6. Specifically, FIG. 5 illustrates a variant of a scheme for providing access according to the specification of the AAP standard (without a mediator). FIG. 6 illustrates a variant of the scheme for providing access according to the specification of the AAP standard using mediators. For greater clarity, the requests for interaction permission are indicated by dashed lines, and the interactions themselves are indicated using solid lines (marked as IPC).

As mentioned above, in the AAP standard, an application 120 or component 110 requiring permission for an interaction will access the IAM 111 and receive permission from the IAM 111. FIG. 5 illustrates an example where application A requests permission from the IAM 111 for interaction with application B and for interaction with a basic component.

In another exemplary aspect of the AAP standard, a decision-making point may be installed within the IAM 111 or may be realized in a particular application 121 (as shown in FIG. 6) working together with the IAM 111, or even in several applications 121, if complex security policies are required. It should be noted that in the given realization, the inter-process communication is also realized through the application 121.

The approaches indicated in FIG. 5 and FIG. 6 have a sizeable number of drawbacks, including:

lack of compatibility between different AAP realizations;

difficulty of specifying the required security policies and monitoring their attributes, such as complete coverage, consistency, time for calculating a decision on allowing an interaction, and others; and lack of control over an increase of a trusted code base of a system designed by the AAP standard.

In order to eliminate these drawbacks, the present disclosure provides an exemplary IAM 111 component. The IAM 111 of the present disclosure is described below in conjunction with FIG. 2.

Figure 2:
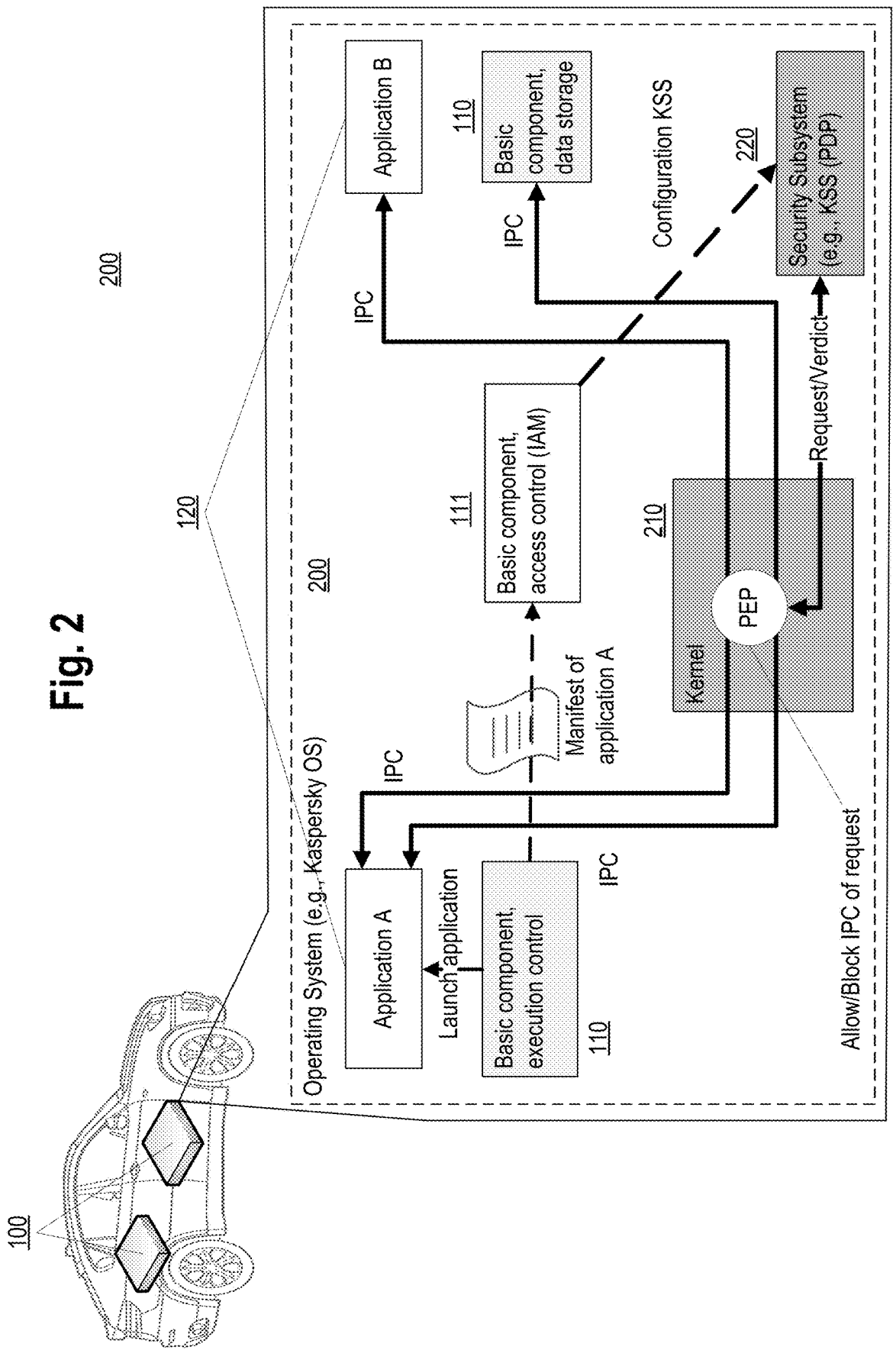
FIG. 2 an operating system of the electronic control unit in accordance with aspects of the present disclosure.

FIG. 2 illustrates an operating system 200 of the electronic control unit (ECU) 100 of vehicle 101 in accordance with aspects of the present disclosure. In one aspect, the operating system 200 is a secure operating system (also commonly referred to as a protected OS or a hardened OS). In one aspect, the secure operating system comprises a Kaspersky operating system (KOS 200, as illustrated in FIG. 2).

As described above, the AAP standard sets forth the requirements for ensuring IT security of systems and platforms based on this standard. However, this standard only provides high-level requirements for the security subsystem and no issues are addressed as to the implementing of this subsystem. In order to address the shortcomings described above, in one aspect, the present disclosure provides a secure operating system 200 for providing access in an ECU 100.

It is noted that the text of the AAP standard describes various approaches for an implementation; for example, a variant is possible using several PDP and PEP points, while these PDP and PEP points themselves may be implemented, as mentioned above, in the form of additional applications 120 working under the control of a platform based on the AAP standard. Using this approach does not allow (or in any case it significantly complicates) the creating of a security subsystem with specified attributes, such as a complete description of the security policies, mutual consistency of those policies, assured confidence in the code of the PDP and PEP, the specification of complex security policies. In addition, this approach also does not allow a realization of security attributes already described in the AAP standard for its basic components 110.

The issue of a trusted code base of a system built on the basis of the AAP standard has extremely great importance for the control systems of a vehicle 101. A trusted code base of a system built on the basis of the AAP standard includes a set of components ensuring the security of the system, so that a compromising or improper working of such components (even only one of them) results in a violation of the security attributes of the system as a whole. From this standpoint, the code of both the PDP and the PEP should necessarily be included in the trusted code base of a system built on the basis of the AAP standard. However, in the case, when it is required to specify the security attributes of a complex system built on the basis of the AAP standard, it is exceedingly difficult to guarantee the proper working of the PDP and PEP unless additional steps are taken. As an example of such steps, one may consider a formal verification (for example, a verification by formal mathematical methods) of the implementation of the PDP and PEP or the generating of the PDP and PEP code on the basis of rules making it possible to guarantee their proper working.

As mentioned above, the original AAP standard provides access control component or IAM 111, which is a check point for the communication processes taking place in a system according to the AAP standards. In one aspect, the present disclosure describes a change to the functionality of the IAM 111 as follows. The change is implemented while preserving the program interface of the IAM 111.

First, the present disclosure provides an AAP program platform that is based on a secure operating system (i.e., a secure operating system 200). FIG. 2 illustrates one example of the secure OS, such as Kaspersky OS 200. The key attributes of the secure OS, e.g., Kaspersky OS 200, is that it enables a realization of a security subsystem for the AAP corresponding to a MILS (multiple independent levels of security) architecture.

One feature of the secure operating system (e.g., Kaspersky OS 200) is the possibility of monitoring the inter-process communications in the system. The KOS 200 may be used to enable specifying maximum detailed security policies for interactions with simultaneous use of a large array of formal security models.

In one aspect, this functionality may be provided by a separate subsystem of the secure OS. For example, the separate subsystem may be the Kaspersky Security System (KSS) 220, as illustrated in FIG. 2.

It should be noted that the methods of inter-process communication realized in the Kaspersky OS 200 are described in U.S. Pat. No. 9,201,712, entitled "System and method for selecting a synchronous or asynchronous inter-process communication mechanism". The subsystem KSS 220 is described in U.S. Pat. No. 9,774,568, entitled "Computer security architecture and related computing method".

In one aspect, the security subsystem of the OS is a single point for the determination of verdicts as to whether or not the access for the interaction is to be provided. For example, the single mechanism for an interaction between program components working under the control of the Kaspersky OS is the IPC provided by the kernel (microkernel) 210 of the operating system 200. In the process of managing the IPC, the kernel 210 requests a verdict from the KSS 220 on whether or not to allow the performing of the IPC (a verdict on granting or denying access for the interaction). The KSS 220 has access to the data being transferred in the IPC process and it performs an analysis of this communication in accordance with security policies specified for the permission, after which a verdict is determined (calculated) as to whether or not the access for the interaction is to be granted. Then, the determined verdict is provided to the kernel 210. Then, the verdict is applied by the kernel 210.

Moreover, the KSS 220 may provide an interface to program components (the KSS security interface) allowing parameters of the security policies to be specified as well as to obtain, from the KSS 220, verdicts on whether or not these or those actions can be carried out.

To illustrate, referring to FIG. 2, consider the procedure for granting access to a service of application B from application A. At the beginning, after the booting of the system, all interactions between applications A and B are forbidden. This means that, when attempting to carry out such an interaction, the kernel 210 will request permission from the KSS 220 to perform such an interaction and will receive a reply such that an interaction is not possible. Accordingly, the attempt to perform this interaction will be blocked.

However, if the manifest of application A contains a statement that an interaction with the service of application B is possible, after receiving this manifest, the IAM 111 will analyze the manifest in order to ascertain the integrity and authenticity of the manifest, and obtain from the manifest information describing the allowable interactions. Next, the component IAM 111, having the exclusive right to modify the security configuration parameters of the solution, will specify through the security interface KSS 220 a parameter of the security configuration indicating whether carrying out the interaction is possible. Then, in the event that the parameter indicates that carrying out the interaction is possible, when an attempt is made to gain access to the service of application B from application A, the KSS 220 will pronounce an affirmative verdict, and the interaction can be carried out.

Let us consider the example of a security policy which can be used to implement the behavior described above.

Suppose application A has an identifier ID_A, which can be defined independently of the application by the OS kernel 210. Similarly, application B has an identifier ID_B. The identifier may be, for example, the ID of the process associated with the given application. Moreover, application B has a set of services (such as interface methods), each of which has its own identifier, the values of these identifiers being specified in the manifest of application B. For instance, the manifest of application A may contain a statement as to the possibility of gaining access to the service of application B, having the identifier ID_SERVICE_B_1.

In the process of the information exchange, all of these parameters are accessible to the OS kernel 210, and the kernel 210 can transmit the parameters to the KSS 220, in order for the KSS 220 to pronounce a verdict as to whether or not the interaction may occur.

In one aspect, the KSS 220 realizes a security policy which is designed as follows. First, a list is maintained for containing triplets, each triplet including the identifier of the client application, the identifier of the service application, and the identifier of the service within the service application. In one aspect, the "list"-type container may be used to simplify the description. In other aspects, other containers may be used. For example, containers, such as "dictionary", may be used to reduce the time to calculate a verdict. In order to make a decision, for each interaction, the KSS 220 obtains the list of the identifiers making up the triplet and performs a search in the list. If the given triplet is found in the list, the interaction is allowed. Otherwise, the interaction is forbidden.

It is noted that this list is empty just after the starting of the ECU 100. However, the IAM 111 has access to the security interface of KSS 220 and can add new triplets to the list through this interface.

In one aspect, the IAM 111 discovers the allowed interactions by analyzing the manifest of the applications. Then, the IAM 111 obtains the corresponding identifiers of the allowed interactions, and uses the security interface to add the identifiers (described above) to the security policy list of the KSS 220. At the same time, other interactions are forbidden, as before.

In one aspect, the present disclosure provides the following enumerated attributes.

1) A check is provided at a point through which all interactions in the system occur, e.g., in the OS kernel 210—thereby preventing the carrying out of an interaction not having undergone a check.

2) The system has a single decision-making point (PDP), operating using formal security models. The usage of the PDP enables the system to: guarantee complete and consistent security policies, calculate the verdicts for granting of access for an interaction in a predictable time, and use formal mechanisms to assess the quality of the security model (for example, the decision-making time). In the MILS architecture described above, it is recommended to have one (single) PDP in a system functioning at the lowest level of the operating system (i.e., in the kernel 210 mentioned above). The present disclosure provides a realization using this approach. Thus, in one aspect, the verdict is determined using a formalized security model. In one aspect, the verdict allows the interaction when the interaction between the basic component and the control application conforms to the formalized security model.

3) The secure operating system of the present disclosure guarantees that all interactions are performed under the monitoring of the security subsystem (e.g., the KSS 220). The rules of interaction are described in a high-level language. The code that computes the verdicts is a generated code, ensuring a high level of confidence in the components (i.e., applications 120) for which the verdicts are being computed in the KSS 220. For example, a rule states that component A cannot have access to component B. Yet the rule may also state that component A has access to component C, and component C has access to component B. By using an integrity model, the KSS 220 will discover that the rule is incorrect, and an error will be put out during the step of analyzing the security configuration.

The present disclosure describes an approach that ensures the fulfillment of the requirements of the AAP standard while at the same time exploits the virtues of the security paradigm afforded by a secure OS, e.g., the Kaspersky OS.

The principal difference between the method of the present disclosure and other approaches is the fact that the IAM 111 is neither a component realizing security policies nor a component providing for enforcement of verdicts. In the system of the present disclosure, the IAM 111 is merely a means for configuring the global security policy. As such, the present approach enables significant simplification of the IAM 111, which in turn makes a detailed analysis possible in order to identify potential vulnerabilities and errors. The actual security policies, the mechanism of computing the verdicts and their enforcement are realized independently in the OS kernel 210 using the KSS 220.

Thus, the ECU 100 of the vehicle 101 functions under the control of an operating system, e.g., a secure operating system 200, which is designed to implement the applications 120 for control of the vehicle 101 and the basic components 110. The secure operating system 200 contains a kernel 210 and a security subsystem 220. The basic components 110 are implemented in the secure operating system 200 and provide interfaces for interaction with the applications 120 and other basic components 110. The applications 120 for control of the vehicle 101 are also implemented in a secure operating system 200 and interact with the basic components 110 through the interaction interfaces. In the general case, said interaction interfaces are interfaces for inter-process communication.

The kernel 210 of the secure operating system provides the inter-process communication between the basic components 110 and the applications 120 for control of the vehicle 101 through the interfaces. For this, the kernel 210 intercepts requests for an interaction of the application 120 with a basic component 110 through the provided interaction interface. The providing of the interaction then occurs based on the verdict received from the security subsystem 220 of the secure operating system 200.

The security subsystem 220 of the secure operating system 200 is the single decision-making point for granting access. In the general case, by using a formalized security model, the security subsystem 220 of the secure operating system 200 determines/renders the verdict as to granting access to the basic components 110 through the interaction interfaces. Access is granted by the security subsystem 220 of the secure operating system 200 if the interaction between the basic components 110 and the control applications 120 of the vehicle 101 conforms to the formalized security model.

Figure 3:
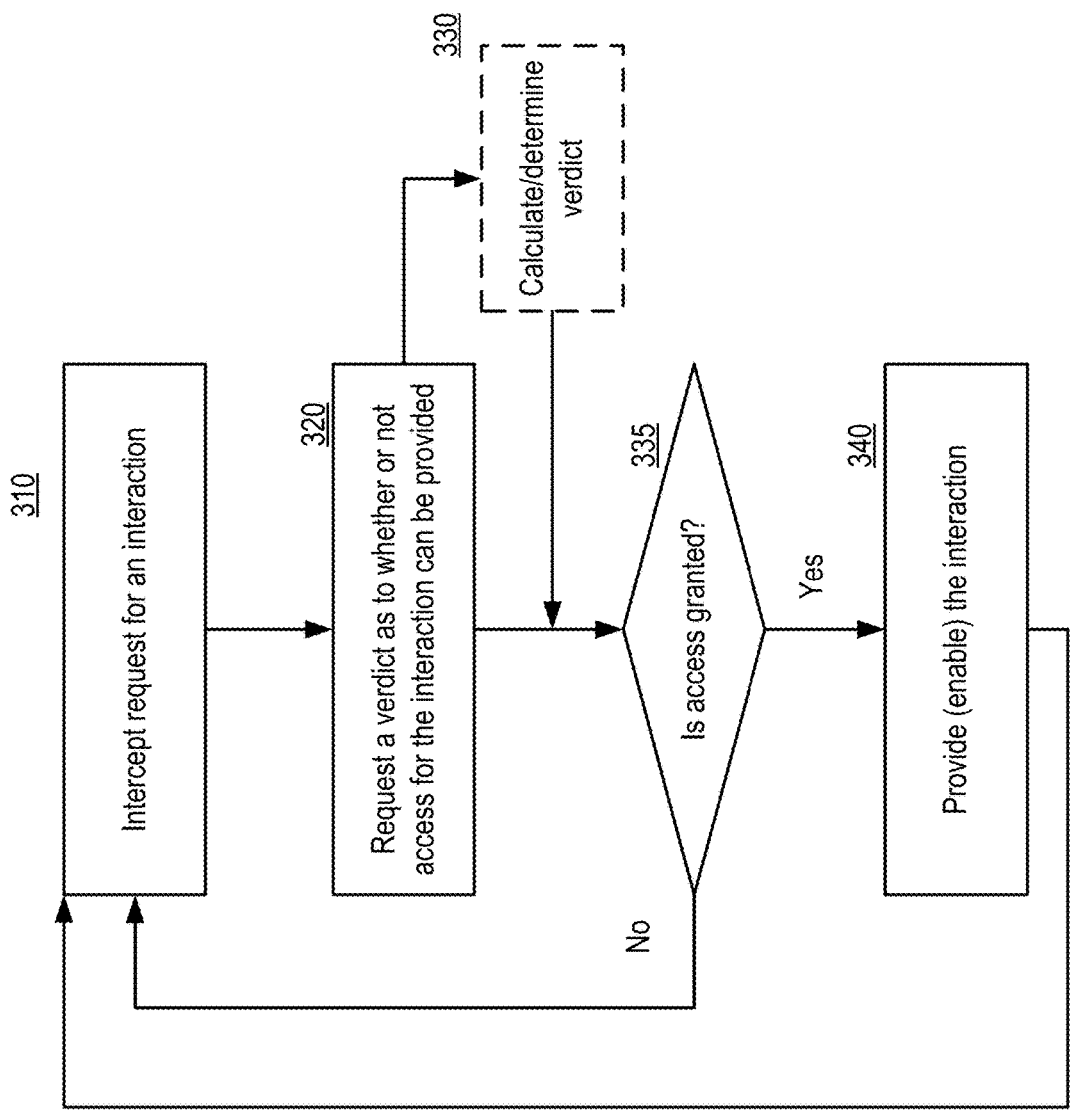
FIG. 3 illustrates an exemplary method for access control in an electronic control unit (ECU) in accordance with aspects of the present disclosure.

FIG. 3 illustrates an exemplary method 300 for access control in an electronic control unit (ECU) in accordance with aspects of the present disclosure.

In step 310, method 300 intercepts, by an operating system (OS) kernel of the ECU, at least one request for an interaction of a control application with a basic component through an interaction interface provided by the basic component for interactions with applications. In a preferred aspect, the OS is a secure operating system, such as the Kaspersky OS. The basic component 110 is a program element of the platform defined in the AAP specification. Furthermore, the basic component 110 provides an interface for interaction with applications 120.

In step 320, method 300 requests, by the OS kernel 210, from the security subsystem 220 of the operating system 200, a verdict as to whether or not access for the interaction of the control application with the basic component through the interaction interface can be provided. In one aspect, the security subsystem of the operating system 200 is the single decision-making point, namely, the single point for calculating of verdicts as to the providing of the access for the interaction.

In optional step 330, method 300, by the security subsystem 220 of the operating system 200, determines a verdict (i.e., calculates or pronounce a verdict) on whether or not the access for the interaction of the application 120 with the basic component 110 through the interaction interface can be provided. In one aspect, the security subsystem 220 of the operating system 200 calculates the verdict using a formalized security model. In the event that the interaction between the basic component 110 and the application 120 conforms to the formalized security model, the calculated verdict allows the interaction between the basic component 110 and the control application 120 of the vehicle 101.

In step 335, method 300, determines whether or not access for the interaction is granted. When the access is granted, the method proceeds to step 340. Otherwise, the method returns to step 310.

In step 340, when the verdict is received from the security subsystem granting the access, method 300 provides, by the OS kernel, the interaction between the basic component and the control application through the interaction interface in accordance with the received verdict. Then, method 300 returns to step 310.

Figure 4:
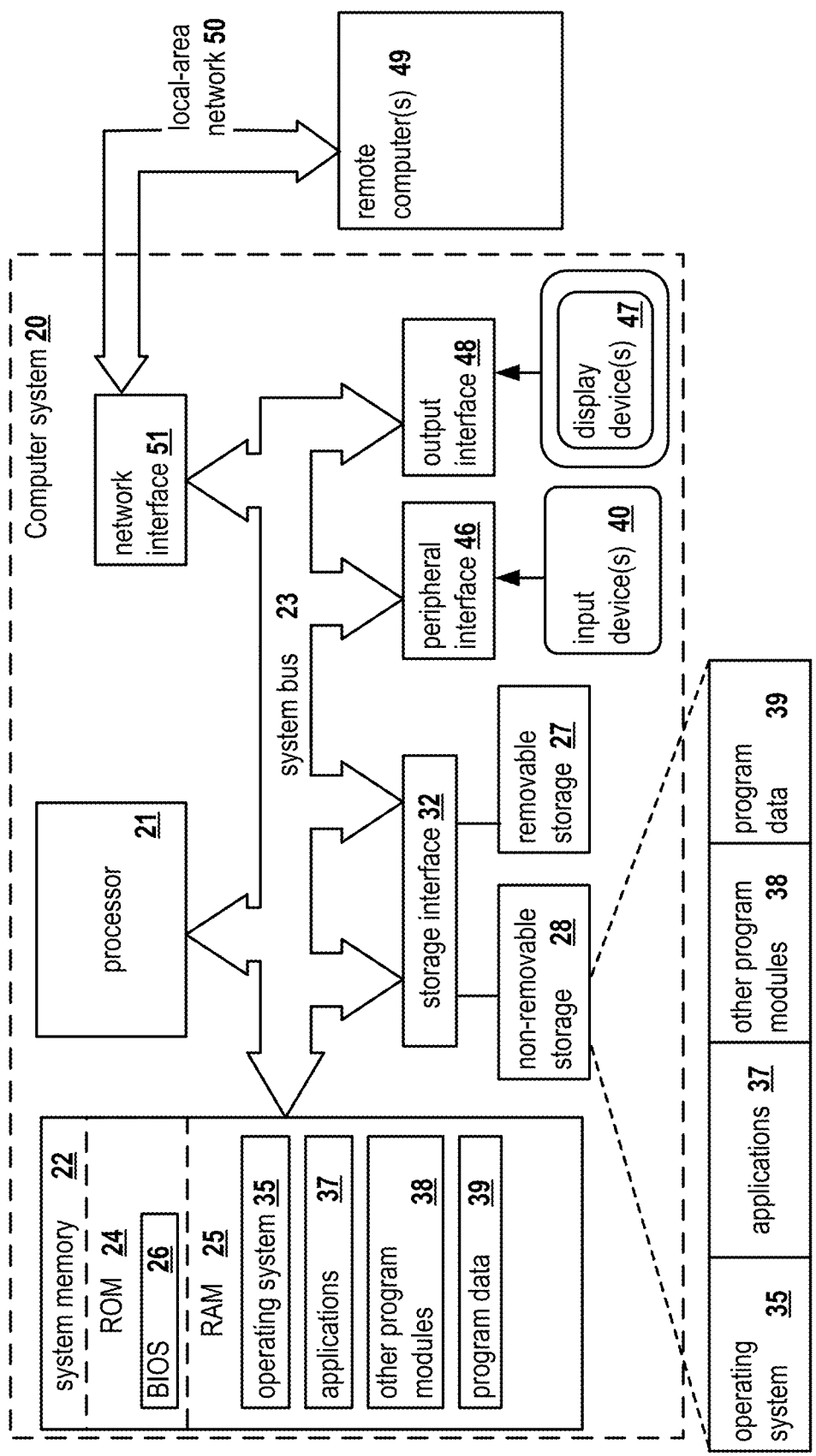
FIG. 4 presents an example of a general purpose computer system on which aspects of the present disclosure can be implemented.

FIG. 4 is a block diagram illustrating a computer system 20 on which aspects of systems and methods for access control in an electronic control unit (ECU) of a vehicle. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for access control in an electronic control unit (ECU), the method comprising: intercepting, by an operating system (OS) kernel of the ECU, at least one request for an interaction of a control application with a basic component through an interaction interface provided by the basic component for interactions with applications, wherein the basic component is a program of an Autosar Adaptive Platform (AAP); requesting, by the OS kernel, from a security subsystem of the operating system, a verdict as to whether or not access for the interaction of the control application with the basic component through the interaction interface can be provided, wherein the verdict is determined using the rules of interaction from a formalized security model; and when the verdict is received from the security subsystem granting the access, providing, by the OS kernel, the interaction between the basic component and the control application through the interaction interface in accordance with the received verdict.

2. The method of claim 1, wherein the operating system comprises a secure OS.

3. The method of claim 1, wherein the ECU comprises a control unit of a vehicle.

4. The method of claim 1, wherein the basic component provides at least one interface for interactions with other basic components.

5. The method of claim 1, wherein the security subsystem of the operating system is a single point for the determination of verdicts as to whether or not the access for the interaction is to be provided.

6. The method of claim 1, wherein the verdict allows the interaction between the basic component and the control application when the interaction between the basic component and the control application conforms to the formalized security model.

7. The method of claim 1, further comprising: determining the verdict by the security subsystem of the operating system.

8. The method of claim 1, the interaction comprises an interaction between a process of an application for control of the ECU and the basic component.

9. A system for access control in an electronic control unit (ECU), comprising: at least one processor of a computing device configured to: intercept, by an operating system (OS) kernel of the ECU, at least one request for an interaction of a control application with a basic component through an interaction interface provided by the basic component for interactions with applications, wherein the basic component is a program of an Autosar Adaptive Platform (AAP); request, by the OS kernel, from a security subsystem of the operating system, a verdict as to whether or not access for the interaction of the control application with the basic component through the interaction interface can be provided; wherein the verdict is determined using rules of interaction from a formalized security model; and when the verdict is received from the security subsystem granting the access, provide, by the OS kernel, the interaction between the basic component and the control application through the interaction interface in accordance with the received verdict.

10. The system of claim 9, wherein the operating system comprises a secure OS.

11. The system of claim 9, wherein the ECU comprises a control unit of a vehicle.

12. The system of claim 9, wherein the basic component provides at least one interface for interactions with other basic components.

13. The system of claim 9, wherein the security subsystem of the operating system is a single point for the determination of verdicts as to whether or not the access for the interaction is to be provided.

14. The system of claim 9, the processor further configured to: determine the verdict by the security subsystem of the operating system.

15. A non-transitory computer readable medium storing thereon computer executable instructions for access control in an electronic control unit (ECU), including instructions for: intercepting, by an operating system (OS) kernel of the ECU, at least one request for an interaction of a control application with a basic component through an interaction interface provided by the basic component for interactions with applications, wherein the basic component is a program of an Autosar Adaptive Platform (AAP); requesting, by the OS kernel, from a security subsystem of the operating system, a verdict as to whether or not access for the interaction of the control application with the basic component through the interaction interface can be provided, wherein the verdict is determined using rules of interaction from a formalized security model; and when the verdict is received from the security subsystem granting the access, providing, by the OS kernel, the interaction between the basic component and the control application through the interaction interface in accordance with the received verdict.

16. The non-transitory computer readable medium of claim 15, wherein the operating system comprises a secure OS, and the control unit comprises a control unit of a vehicle.

* * * * *